United States Patent
Oberheide et al.

(10) Patent No.: US 12,129,903 B2
(45) Date of Patent: Oct. 29, 2024

(54) AGRICULTURAL APPARATUS WITH IMPROVED SUSPENSION

(71) Applicant: Amazonen-Werke H. Dreyer SE & Co. KG, Hasbergen (DE)

(72) Inventors: Friedrich Oberheide, Bissendorf (DE); Anna-Gret Borchert, Osnabrück (DE); Frank Gross Prues, Bersenbrück (DE); Stefan Austermann, Telgte (DE)

(73) Assignee: Amazonen-Werke H. Dreyer SE & Co. KG (DE)

( * ) Notice: Subject to any disclaimer, the term of this patent is extended or adjusted under 35 U.S.C. 154(b) by 96 days.

(21) Appl. No.: 17/638,804

(22) PCT Filed: Aug. 6, 2020

(86) PCT No.: PCT/EP2020/072134
§ 371 (c)(1),
(2) Date: Feb. 25, 2022

(87) PCT Pub. No.: WO2021/037517
PCT Pub. Date: Mar. 4, 2021

(65) Prior Publication Data
US 2022/0325774 A1    Oct. 13, 2022

(30) Foreign Application Priority Data
Aug. 29, 2019    (DE) .................. 10 2019 123 190.6

(51) Int. Cl.
*A01M 7/00* (2006.01)
*A01C 23/00* (2006.01)
*F16F 13/00* (2006.01)

(52) U.S. Cl.
CPC .......... *F16F 13/007* (2013.01); *A01C 23/008* (2013.01); *A01M 7/0071* (2013.01);
(Continued)

(58) Field of Classification Search
CPC . A01M 7/0053; A01M 7/0071; A01C 15/005; A01C 23/008; F16F 13/007;
(Continued)

(56) References Cited

U.S. PATENT DOCUMENTS

| 5,957,383 A * | 9/1999 | Benest .................. A01B 73/04 |
| | | 239/168 |
| 6,402,051 B1 * | 6/2002 | Humpal ................ A01B 73/02 |
| | | 239/165 |

(Continued)

FOREIGN PATENT DOCUMENTS

| EP | 2311318 A1 | 4/2011 |
| EP | 2829177 A1 | 1/2015 |
| WO | 2010100542 A1 | 9/2010 |

OTHER PUBLICATIONS

International Search Report received for PCT International Application (PCT/EP2020/072134), mailed Nov. 12, 2020 (6 pages).
(Continued)

*Primary Examiner* — Nkeisha Smith
(74) *Attorney, Agent, or Firm* — Mintz Levin Cohn Ferris Glovsky and Popeo, P.C.

(57) ABSTRACT

The invention relates to an agricultural apparatus (1) for spreading material, such as fertilizers, plant protection products, or seed, comprising a distributor linkage (10) which can be folded on both sides, comprising a central part (11), where the central part (11) is connected in a rotationally
(Continued)

Figure 1A:
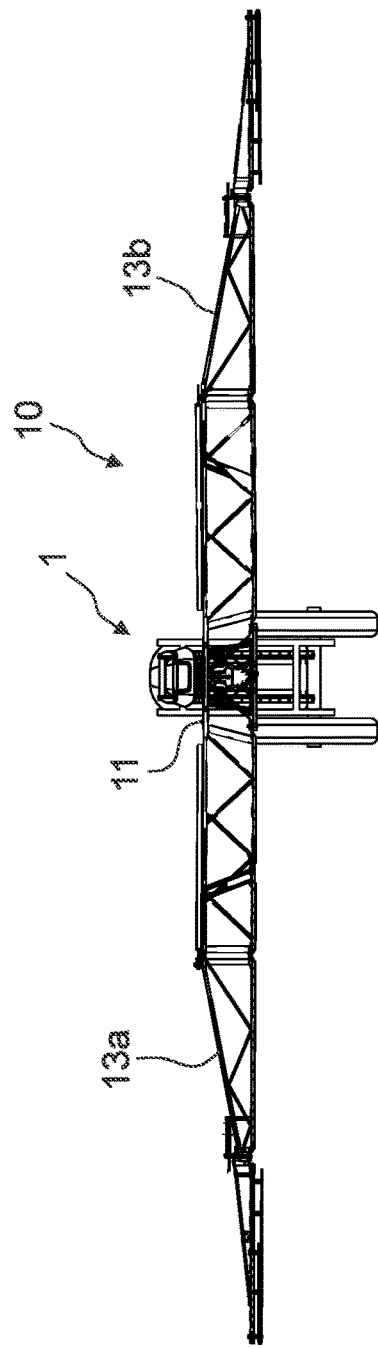

fixed manner to the agricultural apparatus (2), two intermediate frames (12 *a,b*) connected to the central part (11) in particular by joints, two lateral booms (13 *a,b*) connected to the respective intermediate frames (12 *a,b*), and a damping assembly (19) for damping motions of the first boom (13 *a*) and the second boom (13 *b*) in the direction of travel of the agricultural apparatus (1), where the damping assembly connects the intermediate frames (12 *a,b*) to one another in particular independently of the central part (11), or where the damping assembly (19) connects the respective intermediate frames (13 *a,b*) to the central part (11).

10 Claims, 16 Drawing Sheets

(52) U.S. Cl.
CPC ..... *F16F 2222/12* (2013.01); *F16F 2228/066* (2013.01); *F16F 2230/08* (2013.01); *F16F 2230/18* (2013.01); *F16F 2232/08* (2013.01); *F16F 2234/02* (2013.01)

(58) Field of Classification Search
CPC .............. F16F 2222/12; F16F 2228/066; F16F 2228/08; F16F 2228/18; F16F 2230/08; F16F 2232/08; F16F 2232/02
See application file for complete search history.

(56) References Cited

U.S. PATENT DOCUMENTS

| | | | | |
|---|---|---|---|---|
| 6,966,501 | B2* | 11/2005 | Wubben | A01M 7/0071 52/646 |
| 7,740,189 | B2* | 6/2010 | Meyer | A01M 7/0053 239/172 |
| 8,464,967 | B2* | 6/2013 | Kuphal | B05B 1/20 239/161 |
| 8,827,180 | B2* | 9/2014 | Honermann | A01M 7/0071 239/161 |
| 9,021,968 | B2* | 5/2015 | Blunier | A01C 23/008 111/121 |
| 9,504,211 | B2* | 11/2016 | Venton-Walters | F16F 7/104 |
| 9,737,067 | B2* | 8/2017 | Desai | A01B 69/008 |
| 10,188,092 | B2* | 1/2019 | Pilney | A01M 7/0078 |
| 11,234,432 | B2* | 2/2022 | Bartlett | A01M 7/0078 |
| 2011/0017849 | A1* | 1/2011 | Trennenpohl | A01M 7/0053 239/723 |
| 2014/0150416 | A1* | 6/2014 | Lee | E02F 9/2207 92/143 |
| 2021/0195886 | A1* | 7/2021 | Smith | A01M 7/0085 |

OTHER PUBLICATIONS

Search Report issued in German Application No. 10 2019 123 190.6 created Jun. 19, 2020 (7 pages).

* cited by examiner

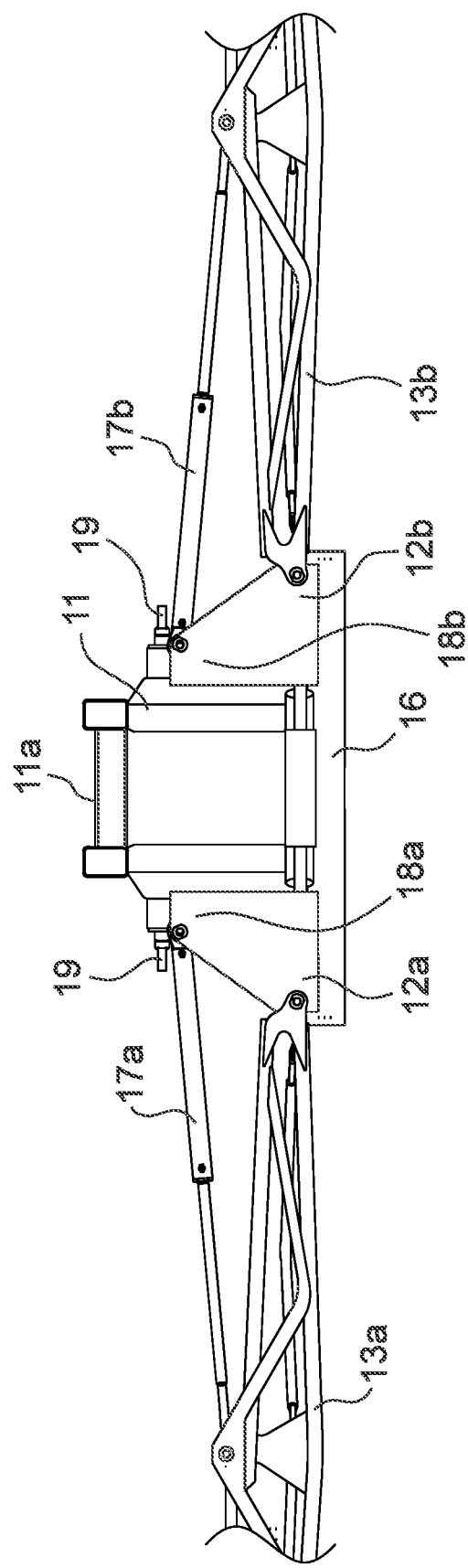

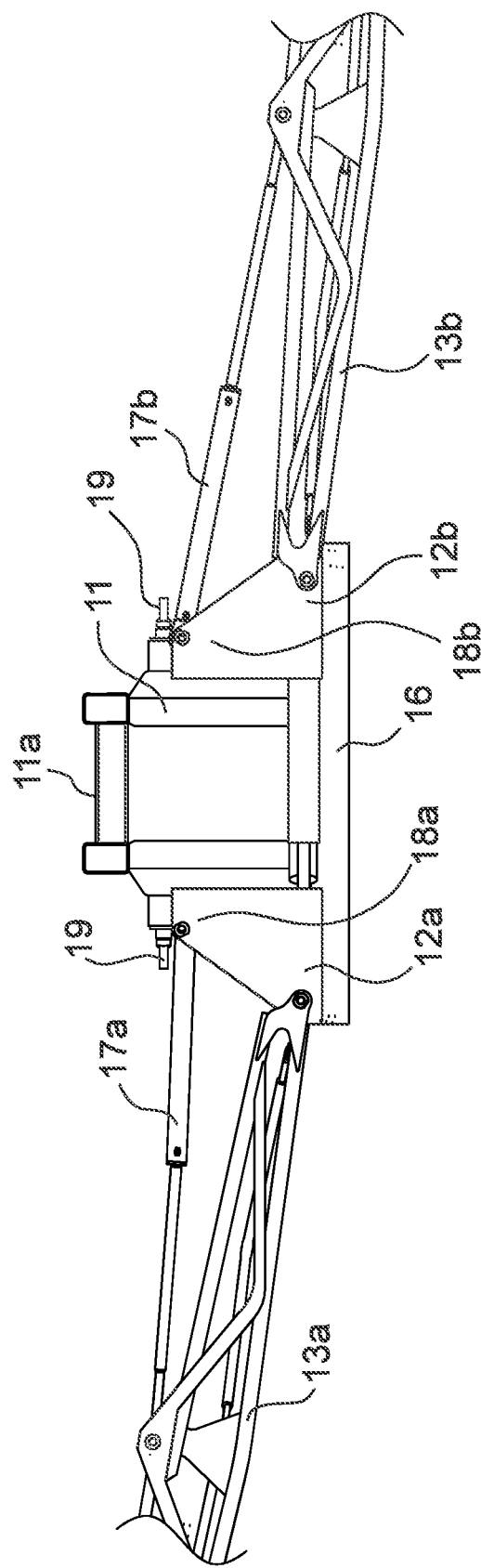

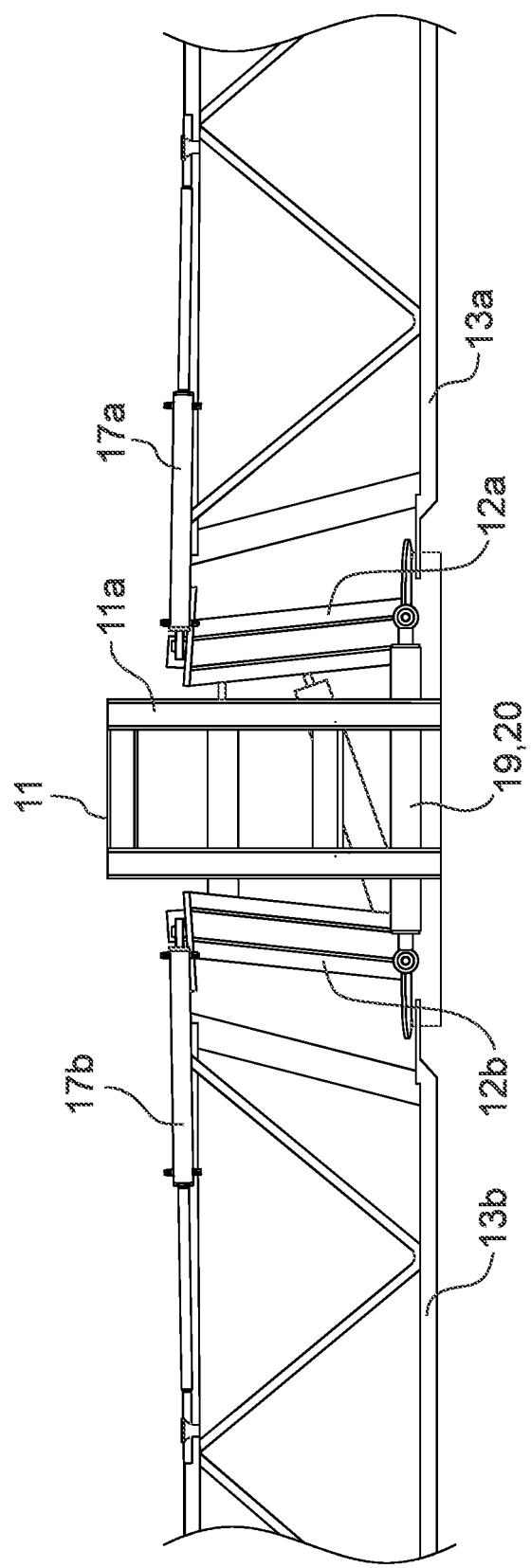

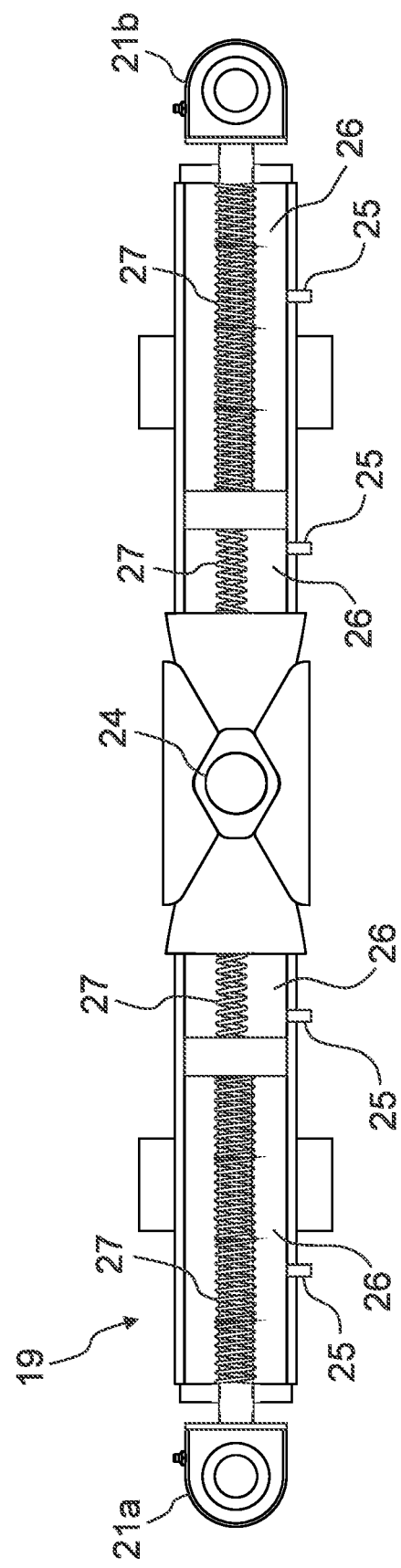

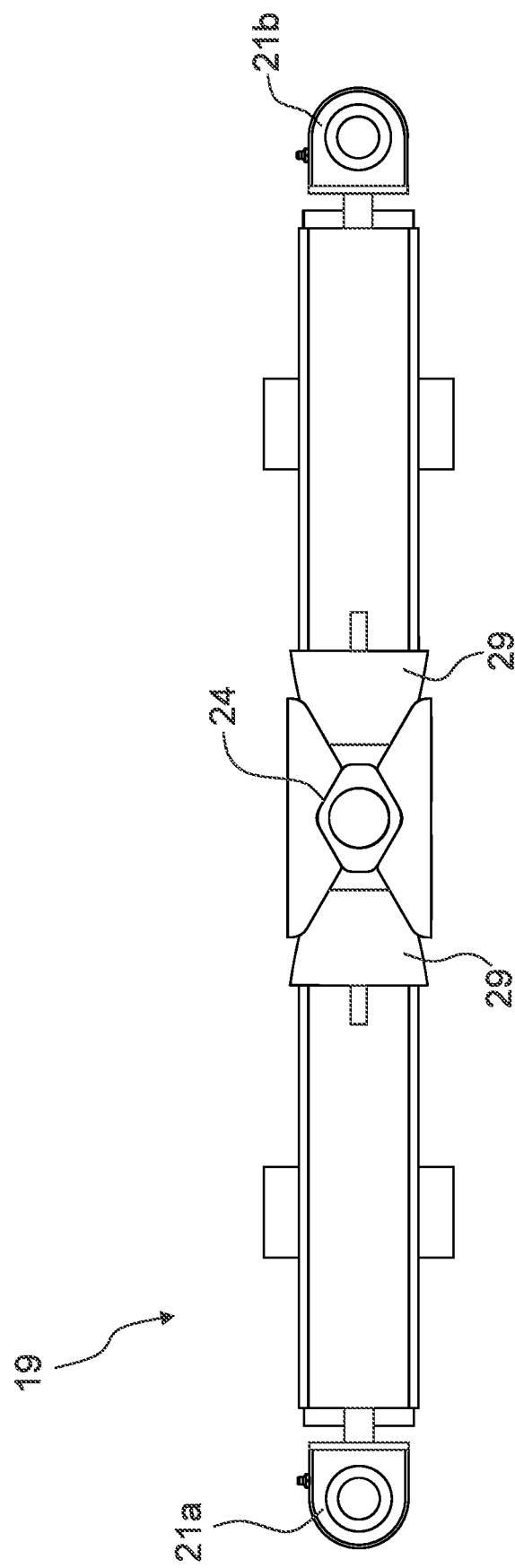

AGRICULTURAL APPARATUS WITH IMPROVED SUSPENSION

CROSS-REFERENCES TO RELATED APPLICATIONS

This application is a US National Stage of International Application No. PCT/EP2020/072134, filed on Aug. 6, 2020, entitled "Agricultural Machine Having Improved Suspension." International Application No. PCT/EP2020/072134 claims the benefit of DE 10 2019 123 190.6, filed on Aug. 29, 2019. The entirety of each these applications is incorporated herein by reference.

The invention relates to an agricultural apparatus. The invention furthermore relates to a method for controlling and/or regulating an agricultural apparatus.

A variety of agricultural apparatuses for spreading material, such as fertilizer, plant protection products, or seed are known, for example, field sprayers. In order to spread the material over a large area and efficiently on the ground of the field to be worked, the agricultural apparatus comprises a distributor linkage with several spreading elements, such as spray nozzles. The distributor linkage extends transverse to the direction of travel and can have working widths of up to 50 m. During operation, the distance between the distributor linkage and the ground should remain as constant as possible over the entire working width of the distributor linkage. This means that the distributor linkage is kept as parallel as possible to the ground to be worked, even if the ground to be worked is uneven.

It is problematic to have the agricultural vehicle drive in ruts of different depths in the ground, in a furrow on one side, or on a slope of the field to be worked. If the ground is uneven in this way, the ends of the distributor linkage can come into contact with the ground and/or crops and be damaged. In addition, the homogeneous distribution of the material to be spread is no longer given due to the inclined position of the distributor linkage relative to the ground and therefore a larger or smaller distance between the ground and individual nozzles.

When operating an agricultural apparatus with such a large working width, vibrations of the distributor linkage in or opposite to the direction of travel can arise, for example, when driving over bumps in the ground, accelerating or braking the apparatus or a commercial vehicle pulling or carrying the agricultural apparatus. Due to such vibrations, very high forces can develop at the distributor linkage and homogeneous material output can no longer be guaranteed. It is therefore known by way of example from EP 2 829 177 B1 to arrange actuating and/or damping devices between the central part and the booms or between the linkage sections in such a manner that, firstly, the distributor linkage can be converted from a transport position to a working position and vice versa, and, secondly, vibrations developing at the distributor linkage in the direction of travel can be damped. The actuating and/or damping devices can be configured, for example, as hydraulically operated cylinders. As a result of vibrations in the distributor linkage, pressure differences arise in the hydraulic cylinders.

It has now shown that known damping systems operate unreliably in driving conditions in which it is absolutely necessary to transfer forces from the apparatus to the distributor linkage, such as when the apparatus accelerates or brakes sharply, or when cornering.

The invention is therefore based on the object of specifying an agricultural apparatus in which improved damping of vibrations developing in or opposite to the direction of travel can take place.

These objects are satisfied by an agricultural apparatus according to claim 1 and a method according to claim 10. Preferred embodiments are described in the dependent claims.

The agricultural apparatus can be, in particular, a field sprayer. The field sprayer can be self-propelled. It can also be a trailed, carried, attached, or mounted sprayer.

Unless explicitly stated otherwise, the terms "horizontal axis/direction" and "vertical axis/direction" hereinafter each refer to an axis/direction that points in the direction of travel of the agricultural apparatus or, respectively, an axis/direction that is perpendicular to the direction of travel of the agricultural apparatus and is perpendicular to the ground.

Furthermore, angling a boom up and down is hereinafter to be understood to be a rotational motion of the boom about a horizontal axis of rotation, in particular the horizontal axis of rotation of the respective intermediate frame. In other words, angling up and down causes a change in the angle of the respective boom relative to the horizontal. The respective boom then moves away from the ground when angling up and towards the ground when angling down. Tilting the distributor linkage accordingly denotes one boom being angled up while the other boom accordingly being angled down. The motion of one or both booms about the respective horizontal axis of rotation is also referred to hereafter as an inclination motion, and the corresponding position is also referred to as inclination.

According to the invention, the distributor linkage of the agricultural apparatus comprises a central part which is attached in a rotationally fixed manner to the agricultural apparatus and two intermediate frames which are connected to the central part by joints. In particular, the connection of the intermediate frames to the central part is configured such that the intermediate frames can are movable about at least one horizontal axis of rotation. Furthermore, the intermediate frames are each movable about a vertical axis of rotation.

The lateral booms of the distributor linkage are each connected to one of the two intermediate frames. In particular, the connection of the booms to the intermediate frame is configured such that a motion of the intermediate frame, in particular a rotational motion about a horizontal axis, is transmitted to the respective boom.

Furthermore, the agricultural apparatus comprises a damping assembly for damping motions of the first boom and the second boom in the direction of travel of the agricultural apparatus. By damping such motions, which can arise, for example, due to the inertia of the booms when the agricultural apparatus is cornering, the forces that are transmitted to the central part are reduced. On the other hand, the damping device also suppresses the transmission of motions from the agricultural apparatus to the respective boom. In other words, the damping device contributes to decoupling the motions of the respective booms from those of the agricultural apparatus and vice versa.

The damping assembly can connect the intermediate frames to one another independently of the central part. This means in particular that the damping assembly is configured to transmit a rotational motion of a boom about a vertical axis to the other boom in a damped manner. In this way it can be avoided that torques, which originate, for example, from vibrations of the distributor linkage in or opposite to the direction of travel, are transmitted to the central part and thereby to the agricultural apparatus. At the same time, damping such vibrations of the distributor linkage can be achieved.

Alternatively, the damping assembly can connect the respective intermediate frames to the central part. This can be realized, for example, by two individual damping elements, each of which connects an intermediate frame to the central part. Such an embodiment can be particularly advantageous for active damping regulation, as is described further below, since the respective booms can be specifically influenced there. The transmission of forces from the respective boom to the central part can be largely suppressed in this embodiment with suitable active damping regulation.

The damping assembly can comprise at least one hydraulic damping element, in particular a hydraulic cylinder.

The damping assembly can furthermore comprise at least one hydraulic valve, in particular a proportional directional control valve which is associated with the at least one hydraulic damping element. The "spring constant" of the hydraulic damping element can be regulated with such a valve by the pressure set at the damping element. Furthermore, active damping regulation can be achieved in this manner.

In conjunction with pressure sensors, the hydraulic valves can be configured as pressure regulating valves for maintaining a pressure on the consumer side, i.e. a pressure at the hydraulic damping element, as a function of an electrical control signal, in particular a control current.

The hydraulic valve can be, for example, a directly controlled and spring-loaded three-way valve, for example, having a slide design. In the de-energized state or without a control signal, respectively, the pressure at the consumer is relieved toward a hydraulic tank. With a maximum control signal, the maximum possible pressure (either the pressure supply or the maximum value of the hydraulic valve) is regulated in a manner adjusted to the consumer.

When a control signal is applied, the spring load in the valve is counteracted electromagnetically and the pressure on the consumer side is thereby maintained according to the control characteristic of the valve. For example, the pressure set is then proportional to the control signal which is in particular a control current. However, such a proportional control characteristic is not absolutely necessary and can be replaced, for example, by non-proportional activation for cost reasons. For this purpose, any desired control characteristics can be stored in the control unit for calculating and outputting control signals that match individual setpoint pressure values.

The valves can comprise in particular a valve body with a control piston, a return spring, and a magnet coil with an armature for electrical activation. When an electrical signal is applied via the control unit, the armature can press on the control piston with a force that corresponds to the signal. This allows oil to flow through the valve and pressure to be built up or released, whereby the actuating device can be activated. This continues until the pressure applied corresponds to the setpoint pressure according to the electrical signal.

In general, the mode of operation of proportional pressure regulating valves is based on the regulation of a pressure difference that arises. If the pressure falls below a preset level, the valve automatically supplies oil from the hydraulic reservoir until the setpoint has been reached again. Otherwise, if the pressure level is too high, oil is drained. The use of proportional pressure regulating valves provides efficient control and stability characteristics, as well as a small hysteresis of the valves, which can arise due to friction and magnetization. Furthermore, proportional valves enable space-saving installation as well as simple assembly and replacement.

The hydraulic valves can be set to a setpoint value in an electronically controlled manner using a known characteristic curve. The characteristic curves describe, for example, the relationship between a pressure arising and the associated electrical current required at a control coil of the valve. For example, a setpoint value to be set for the hydraulic valves can be determined by way of the pressure sensors described above, as a result of which a control current is applied to the valves on the basis of the characteristic curve in order to set the corresponding pressure. This has the advantage that the pressure at the distributor linkage can be adjusted precisely to a setpoint value using the characteristic curve of the hydraulic valves.

Alternatively or additionally, the damping element can comprise one or more mechanical spring elements. For example, the damping element can comprise rubber buffers. It is also possible for the hydraulic damping elements to comprise an additional mechanical spring element. It can be achieved with such spring elements that a restoring force can be exerted upon the hydraulic damping elements when forces, in particular dynamic forces, act upon the hydraulic damping elements. Dynamic forces are presently to be understood to be forces that are caused by motions of the agricultural apparatus and/or the respective booms. An occurrence of such dynamic forces leads to a motion of a movable element, for example, a piston, of the hydraulic damping element. The spring element can be arranged such that it deforms, in particular compresses or stretches, when the movable element of the hydraulic damping element is displaced. The spring element can then exert a corresponding restoring force upon the movable element which is opposite to the motion. Furthermore, it is also possible that additional passive damping of the motion can be achieved by such mechanical spring elements.

The agricultural apparatus can comprise a sensor device configured to detect vibrations of the respective booms about a vertical axis. In this case, it is possible to react to the vibrations detected by activating the hydraulic valve associated with the at least one hydraulic damping element and thereby actively dampen the vibrations. For this purpose, the sensor device can comprise one or more sensors.

The sensor device can comprise one or more pressure sensors, where the pressure sensors are configured to detect a pressure or a change in pressure in the hydraulic damping element The force that is exerted upon the at least one hydraulic damping element by a motion of a boom about the respective vertical axis of rotation is manifested in a change in pressure inside the hydraulic damping element. Vibrations of a boom in and opposite to the direction of travel of the agricultural apparatus can then be detected by way of the pressure measurement at the hydraulic damping element.

The pressure sensors can be embodied as pressure sensors for direct pressure measurement, in particular as pressure transducers. Such a configuration has the advantage that it allows both a relative pressure and an absolute pressure to be determined. Furthermore, the pressure sensors can preferably be formed as differential pressure transducers for determining a differential pressure or a pressure difference arising, respectively. Advantageously, the pressure transducers can detect the pressure to be measured by way of a measuring membrane which is mechanically deformed as a function of the respective pressure. This mechanical change can be measured electronically, be output as an analog or digital output signal, and transmitted, for example, to the control unit.

It is also possible for the agricultural apparatus to comprise hydraulic actuating devices by way of which the booms can be moved about a vertical axis of rotation. In particular, these hydraulic actuating devices can be configured to convert the respective boom from a transport division to a work division, and vice versa. In this case, the sensor device can also comprise additional or alternative pressure sensors that detect a pressure at these hydraulic actuating devices. Similar to the pressure measurement at the hydraulic damping element, vibrations that occur in and opposite to the direction of travel can be determined in this way.

Alternatively or additionally, the sensor device can comprise acceleration and/or motion sensors, where the acceleration and/or motion sensors are arranged on the respective booms. Motions of the booms can be directly detected by way of such sensors.

The agricultural apparatus can furthermore comprise a control unit that is configured to process the values of the sensor device and to actuate the at least one hydraulic valve based on the sensor values processed so that a detected vibration is actively damped. In particular, the control unit can be configured to process the values of the sensor device using a controller, in particular a PID controller (proportional-integral-derivative controller) and to control the at least one hydraulic valve based on the output of the controller. In other words, the control unit can be configured to control the at least one hydraulic valve such that a setpoint pressure prevails at the hydraulic damping element. If the damping assembly comprises a plurality of hydraulic damping elements, then the regulating device can be configured to control the respective hydraulic valves based on the values of the sensor device such that a setpoint pressure prevails at the respective hydraulic damping elements, where the respective setpoint pressures can also differ from one another.

The hydraulic damping element can comprise at least two hydraulic chambers, where each hydraulic chamber is associated with a hydraulic valve. This allows the hydraulic pressure in each chamber to be adjusted individually. Precise active vibration damping can be achieved in this manner.

Furthermore, at least one hydraulic chamber of the hydraulic damping element can comprise a mechanical spring element. As described above, the spring element can exert a restoring force on the respective hydraulic chamber when the respective boom moves. In the event of vibrations occurring, effective vibration damping can then be achieved even with small adjustments of the pressure in the chamber.

The agricultural apparatus can comprise at least two hydraulic actuating devices, where a first hydraulic actuating device connects the central part to a first of the two intermediate frames so that the corresponding first boom can be moved about a first horizontal axis by way of the first hydraulic actuating device. The second boom can be moved about a second horizontal axis by way of a second hydraulic actuating device.

Improved and simplified inclination control of the respective booms can be achieved due to the fact that the two booms are attached separately in a rotatable manner to the rotationally-fixed central part by way of the respective intermediate frames, where at least two hydraulic actuating devices are provided for adjusting the inclination of the intermediate frames. Changes in inclination at the distributor linkage can thus be achieved for the agricultural apparatus according to the invention by directly controlling the booms, unlike the known agricultural apparatuses described above.

The central part can comprise a transverse frame in its lower region. The first and the second intermediate frames can be arranged pointing upwardly on the transverse frame. The first and the second horizontal axis of rotation can be arranged in the lower region of the first and the second intermediate frame. In other words, with this arrangement, the respective horizontal axes of rotation can be disposed in the vertical direction close to the spray nozzles of the linkage. In order to cover the entire working width of the agricultural apparatus, spray nozzles are provided both on the respective booms as well as on the central part. Since angling a boom up creates a gap between the boom and the central part, the distance between the spray nozzles arranged on the respective boom and the spray nozzles provided on the central part increases. This results in a region of the ground travelled over which cannot be covered, or only insufficiently, by the spray nozzles. By arranging the horizontal axis of rotation in the lower region of the distributor linkage, it is achieved that this gap be kept as small as possible.

The first hydraulic actuating device can be connected to the first intermediate frame in the upper region of the first intermediate frame and to the central part in the lower region, in particular to the transverse frame and spaced from the first intermediate frame. It can be achieved with such an arrangement that the two points of action of the first actuating device are each at the greatest possible distance from the first axis of rotation. Advantageous transmission of force from the first actuating device to the first intermediate frame can be achieved in this way.

The first and the second actuating device can be configured as a hydraulic cylinder, in particular as a double-action hydraulic cylinder. Such cylinders provide an inexpensive and simple option of controlling the position of the distributor linkage. The double-action hydraulic cylinders can each be configured, for example, with a piston that can be pressurized on both sides.

One or more pressure sensors can also be associated with the hydraulic devices. Motions of a boom and the associated intermediate frame can transfer corresponding forces to the respective hydraulic actuating device, which in turn can reflect changes of pressure in the hydraulic actuating device. These changes of pressure can be detected by way of the pressure sensors mentioned. Furthermore, a pressure prevailing at the hydraulic actuating device can also correspond to an inclined position of a boom. In this case, the inclination of a respective boom can also be monitored with the pressure sensors.

Respective hydraulic valves can be associated with the first and the second hydraulic actuating devices. The hydraulic valves can be configured as described further above.

Furthermore, a check valve associated with the respective hydraulic valve can be associated with the first actuating device and the second actuating device. In particular, the outflow of hydraulic fluid from the respective actuating device can be prevented with such a check valve. The respective booms can be locked therewith in a desired position. This can be desirable, for example, in situations such as road transport or when folding the distributor linkage in and out in which the distributor linkage is to be rigidly connected to the agricultural apparatus by way of the actuating device.

The hydraulic actuating devices can also be connected to a hydraulic circuit via the respective hydraulic valves. The hydraulic circuit can be an open circuit comprising, for example, a pump and a hydraulic tank.

The respective booms can be configured to be multi-part. They can comprise foldable segments that can be moved about an axis running perpendicular to the direction of travel. The booms can still be folded in and out in segments. They can also assume intermediate positions. This makes it possible to adjust the working width of the agricultural apparatus in that a certain number of segments are folded out. In particular, this can be done for one boom independently of the other boom. Sensors, in particular potentiometers, can be attached to the joints disposed between the foldable segments for determining the folding states. These sensors can detect segments that are fully folded in/folded out as well as intermediate positions at the joints between adjacent segments and transmit the respective folding status to the control unit. In addition, it is possible by way of the segmentation described to fold the boom in a compact manner, for example, to a transport position.

The second hydraulic actuating device can connect the intermediate frames to one another, in particular in the upper region of the intermediate frames. In this embodiment, the inclination control of the respective booms can be achieved by an interaction of the two hydraulic actuating devices. For example, the extension or retraction of the piston of the first actuating device can cause the first boom to angle down or up. Since the two intermediate frames are coupled by way of the second actuating device in this embodiment, the resulting motion of the first intermediate frame can be transmitted to the second intermediate frame. Depending on the desired position of the second boom, the piston of the second actuating device can also be extended or retracted.

If, for example, only the first boom is to be angled up, then the piston of the first actuating device can be retracted in this embodiment. In order to prevent the resulting motion of the first intermediate frame from being transmitted to the second intermediate frame, the piston of the second actuating device can likewise be retracted. This can be done, for example, by actively controlling the second actuating device.

If, for example, only the second boom is to be angled up, then the piston of the second actuating device can be retracted in this embodiment. The piston position of the first actuating device, however, can be maintained. This can be done, for example, by actively controlling the first actuating device, but also by locking the first actuating device, for example, by way of a check valve. In this case, the first intermediate frame is therefore affixed by way of the first actuating device.

For example, if the entire distributor linkage is to be tilted, the piston of the first actuating device in this embodiment can be retracted or extended depending on the desired direction of inclination. The piston position of the second actuating device, however, can be maintained. This can be done, for example, by actively controlling the second actuating device, but also by locking the second actuating device, for example, by way of a check valve. As a result, the motion of the first intermediate frame can be transmitted to the second intermediate frame, and both booms can move in the same direction about their respective axes of rotation. This leads to one of the booms angling up and to the other boom respectively angling down, and therefore to the linkage tilting.

This embodiment therefore allows for flexible and simple inclination control of the entire distributor linkage. It goes without saying that any inclination position of the booms is possible by appropriate control of the respective actuating devices.

Alternatively, the second hydraulic actuating device can connect the second of the intermediate frames to the central part. In this embodiment, the inclination control of the first and the second boom can be performed independently. The first actuating device can there be responsible for the inclination control of the first boom, and the second actuating device can be responsible for the inclination control of the second boom. For example, the extension or retraction of the piston of the first actuating device can cause the first boom to angle down or up. Similarly, the extension or retraction of the piston of the second actuating device can cause the second boom to angle down or up. In particular, the hydraulic actuating devices can be arranged such that a motion of the first intermediate frame does not affect the second intermediate frame, and vice versa.

For example, in order to angle the first boom up or down, the piston of the first actuating device can be retracted or extended in this embodiment. The second actuating device and the second intermediate frame can there remain unchanged. The position of the second boom then also does not change. Similar thereto, the piston of the second actuating device can be retracted or extended for angling the second boom up or down. The first actuating device and the first intermediate frame can there remain unchanged. The position of the first boom then also does not change.

This embodiment therefore allows for simple individual inclination control of the two booms. In this embodiment, tilting the entire distributor linkage can be achieved by individually angling one boom up and simultaneously individually angling the other boom down. It goes without saying that any inclination position of the booms is possible by appropriate individual control of the respective actuating devices.

The second hydraulic actuating device in this embodiment can be connected to the second intermediate frame in the upper region of the second intermediate frame and to the central part in the lower region, in particular to the transverse frame and spaced from the second intermediate frame. In other words, the second hydraulic actuating device can be arranged at an angle in the vertical direction between the second intermediate frame and the central part. It can be achieved with such an arrangement that the two points of action of the second actuating device are each at the greatest possible distance from the second axis of rotation. Advantageous transmission of forces from the second actuating device to the second intermediate frame can be achieved in this way.

The intermediate frames can each be connected to the central part by way of a ball joint. Such a connection allows for the intermediate frames to be moved about both a horizontal as well as a vertical axis in a simple manner.

The agricultural apparatus can further comprise a third hydraulic actuating device, where the third hydraulic actuating device connects a first of the booms to the respective first intermediate frame, where it is possible for the first boom to be moved by way of the third hydraulic actuating device about a first vertical axis of rotation. In addition, the agricultural apparatus can comprise a fourth hydraulic actuating device, where the fourth hydraulic actuating device connects the second of the booms to the respective second intermediate frame, where it is possible for the second boom to be moved about by way of the fourth hydraulic actuating device a second vertical axis of rotation.

The third and the fourth hydraulic actuating devices can be particularly suitable to transfer the booms of the distributor linkage from a transport position to a working position and vice versa. In the case of field sprayers such as those described at the outset, such actuating devices, also referred to as folding cylinders, typically connect the respective booms directly to a central part of the linkage. This has the disadvantage that, when a boom inclination is controlled in relation to the central part, the folding cylinders always have to be controlled as well. This can advantageously be avoided by the connection described of the folding cylinders to the intermediate frame and the boom.

The invention further provides a method according to claim 10 for controlling an agricultural apparatus as described above. The method comprises the following steps of:

the sensor device detecting sensor values.
the control unit processing the sensor values.
actuating the hydraulic valve based on the sensor values processed so that a detected vibration is actively damped by the hydraulic damping element.

Figure 1B:
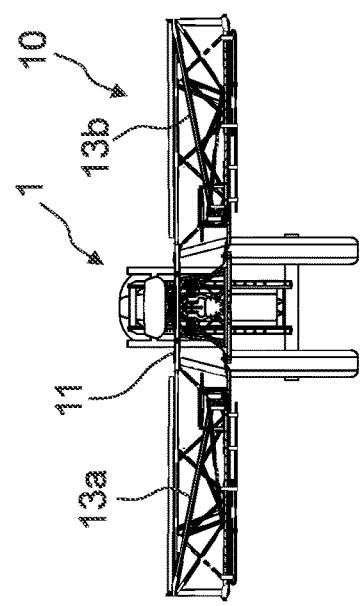
Figure 1C:
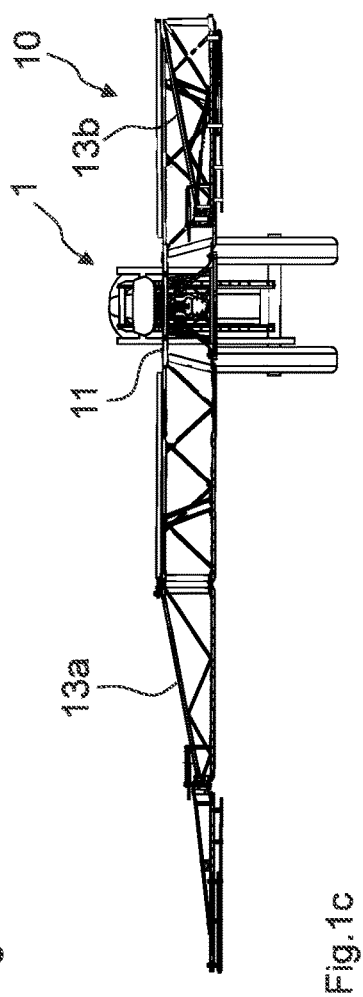
Figure 2:
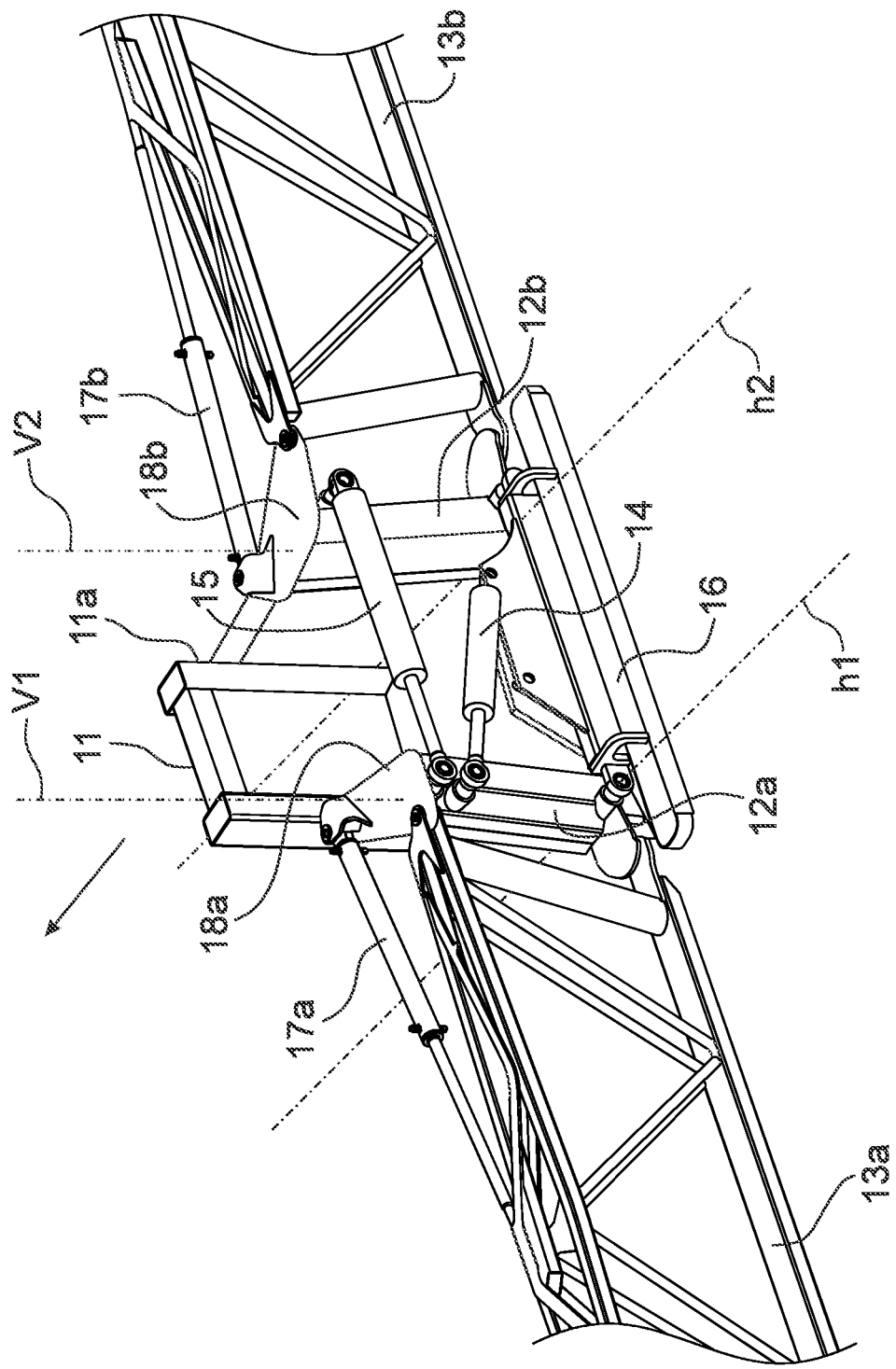
Figure 3:
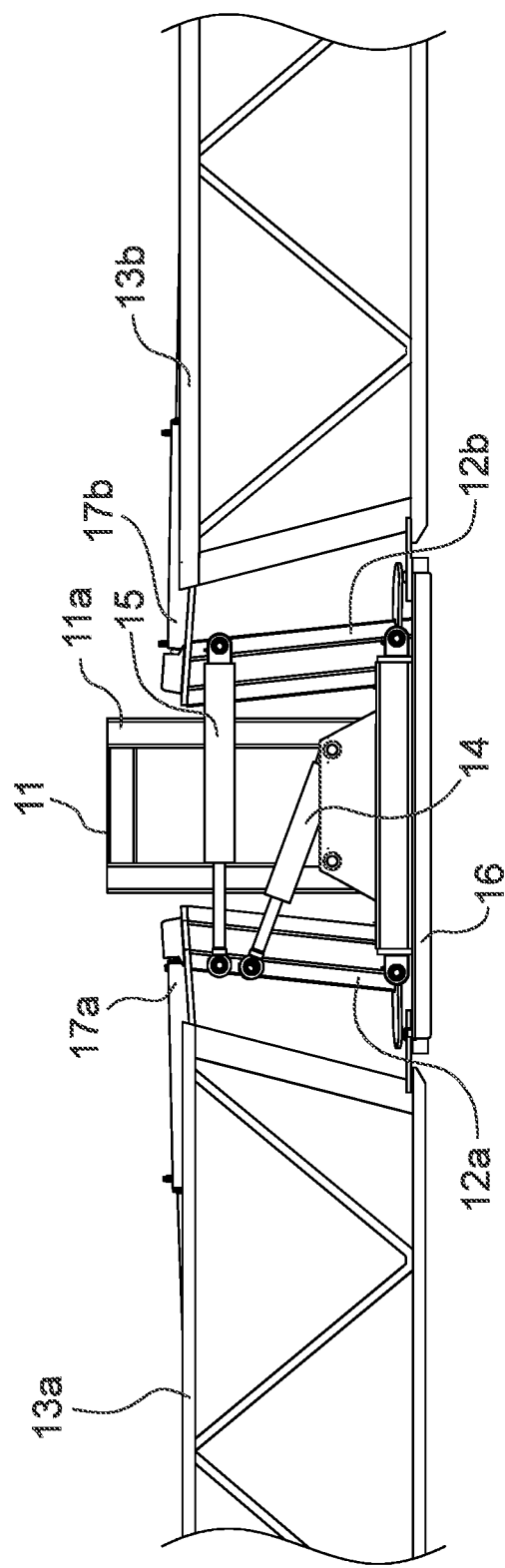
Figure 4A:
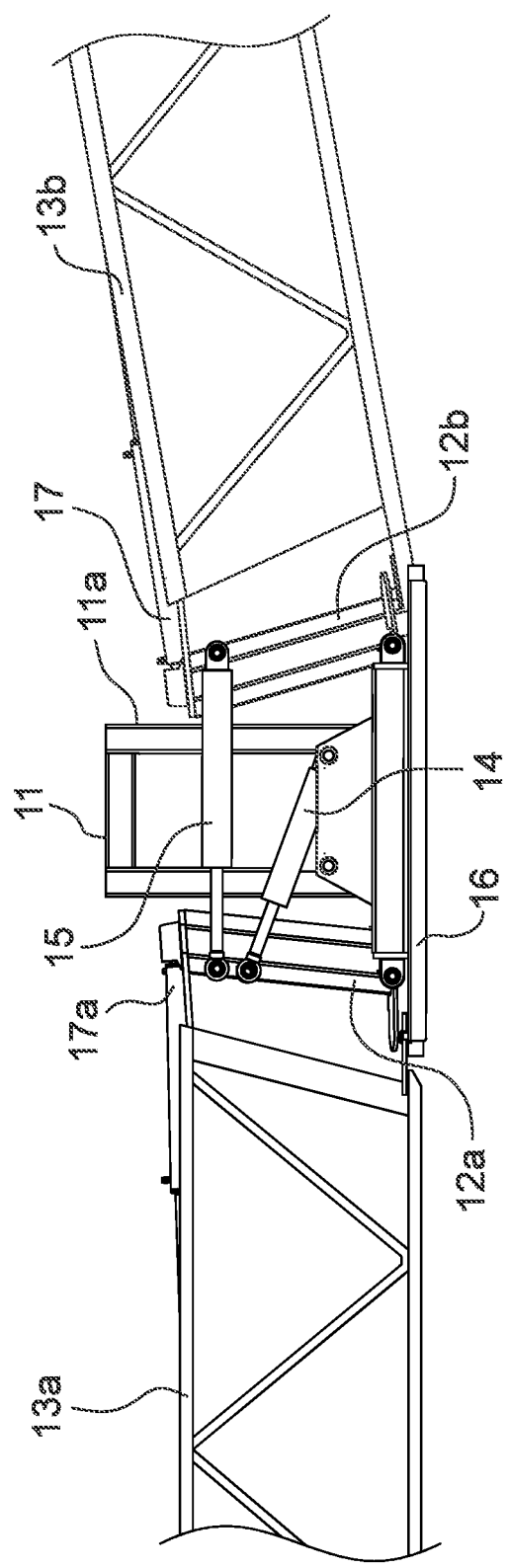
Figure 4B:
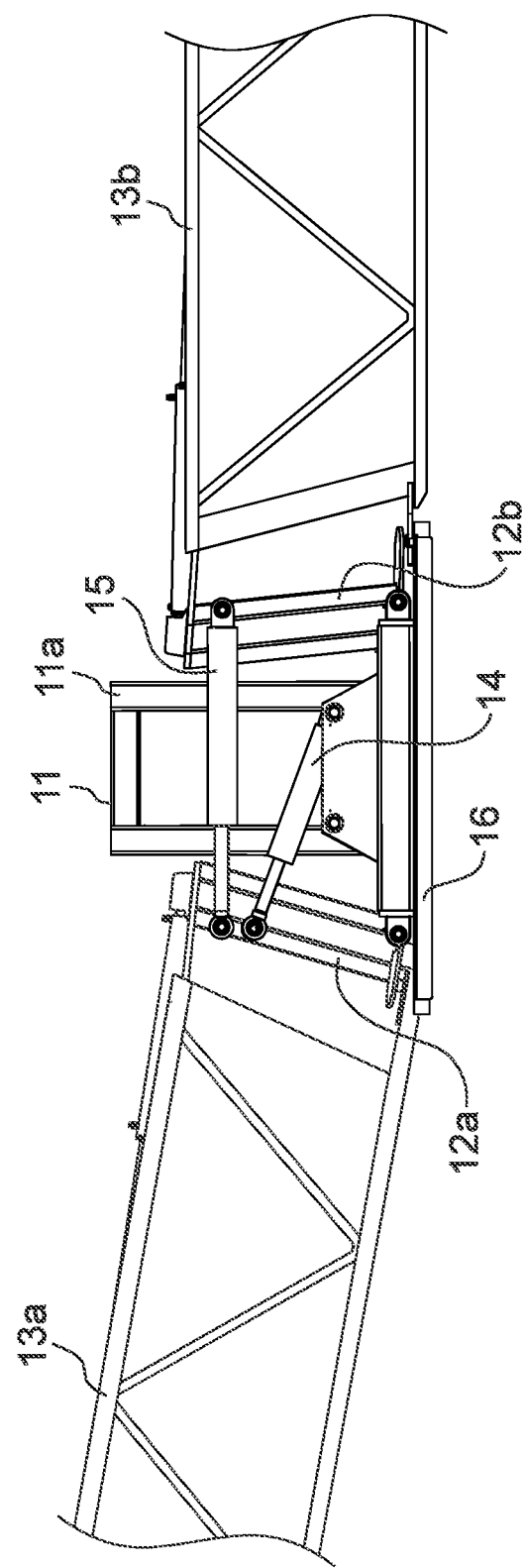
Figure 4C:
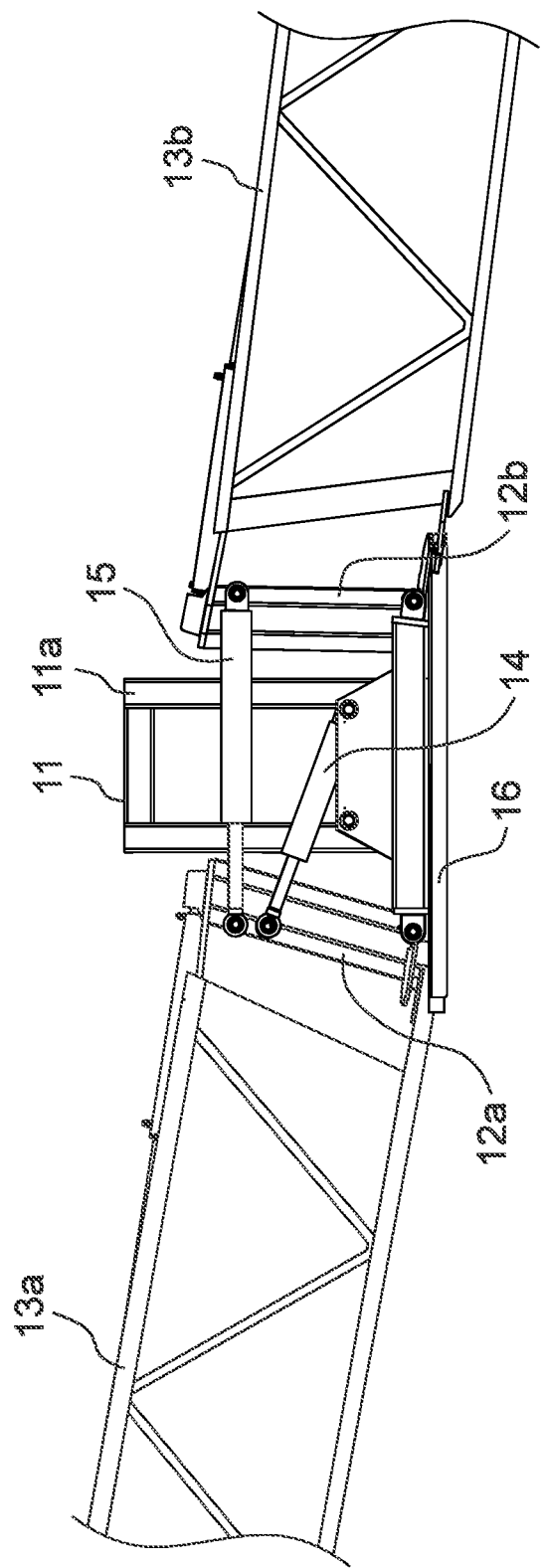
Figure 5:
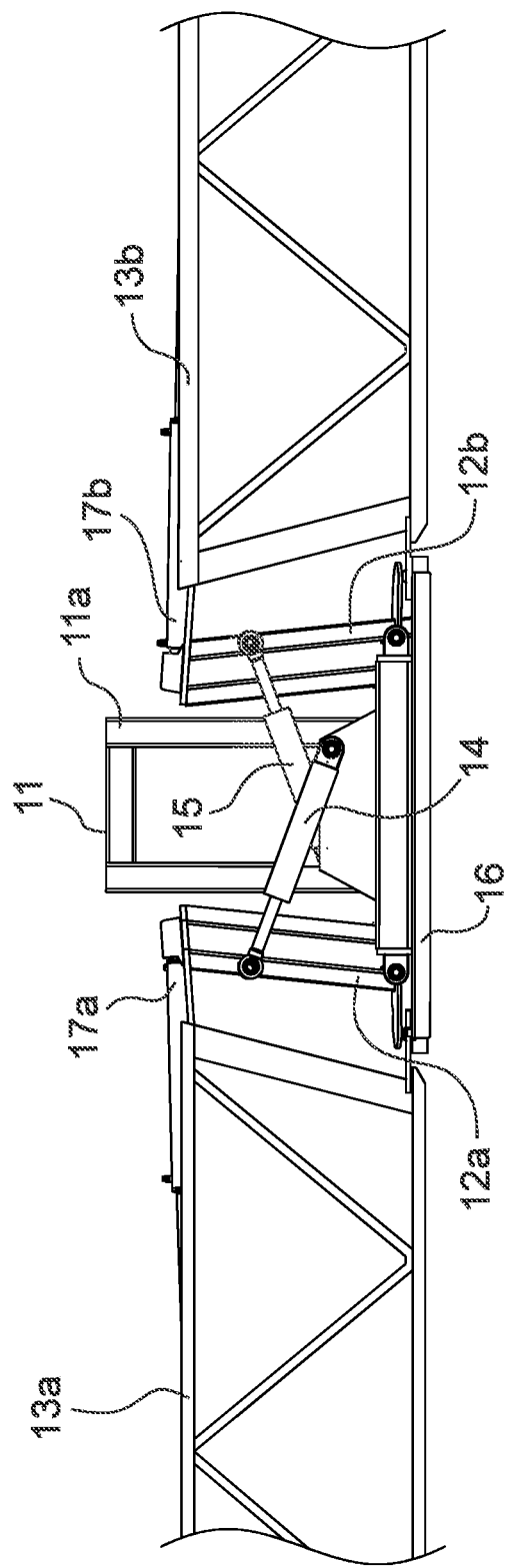
Figure 7B:
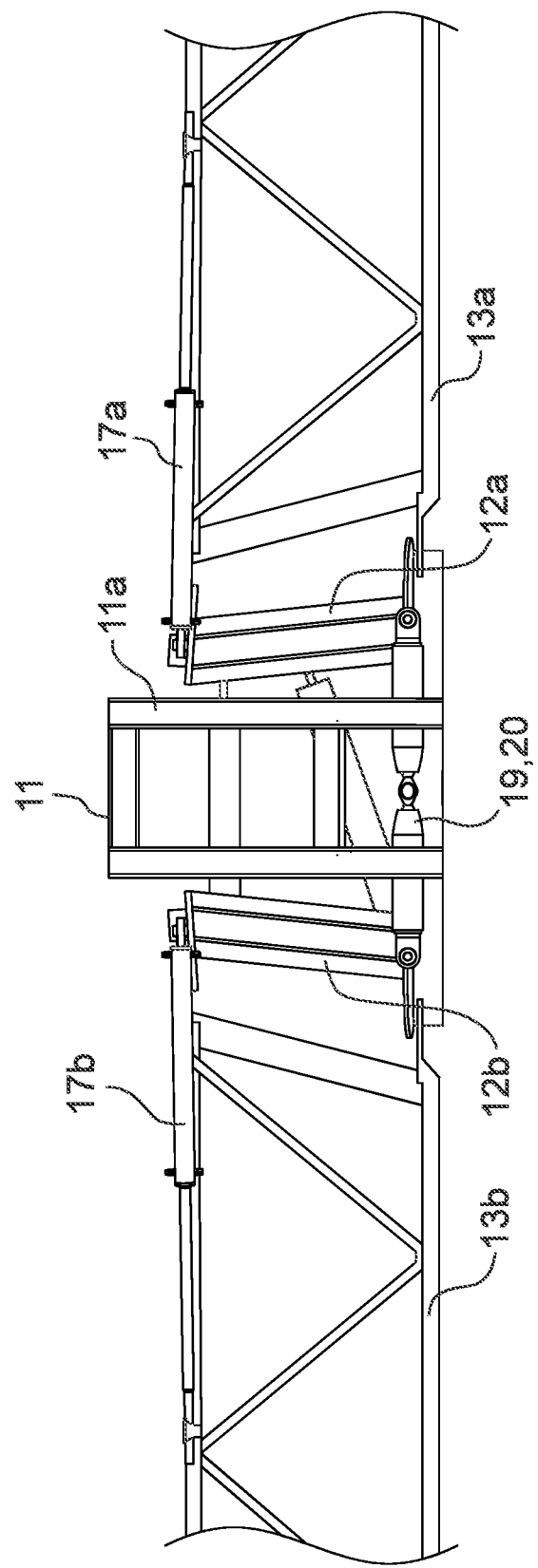
Figure 8:
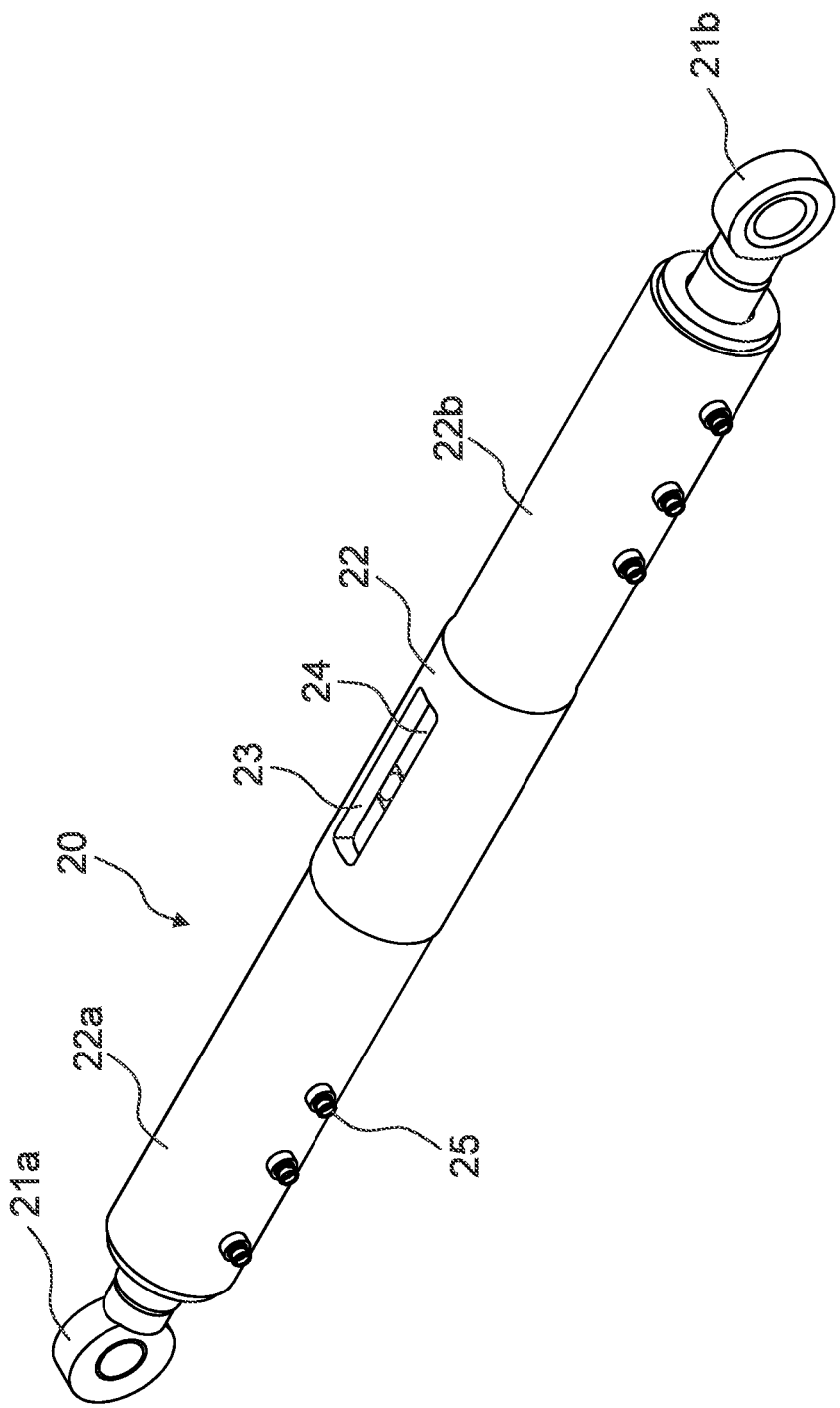
Figure 9A:
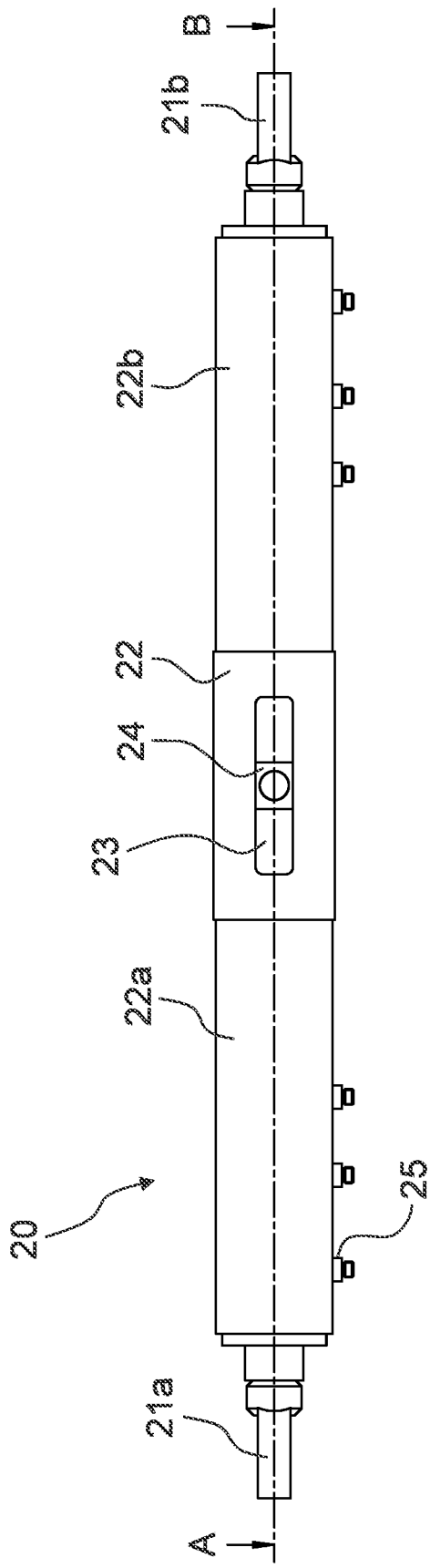
Figure 9B:
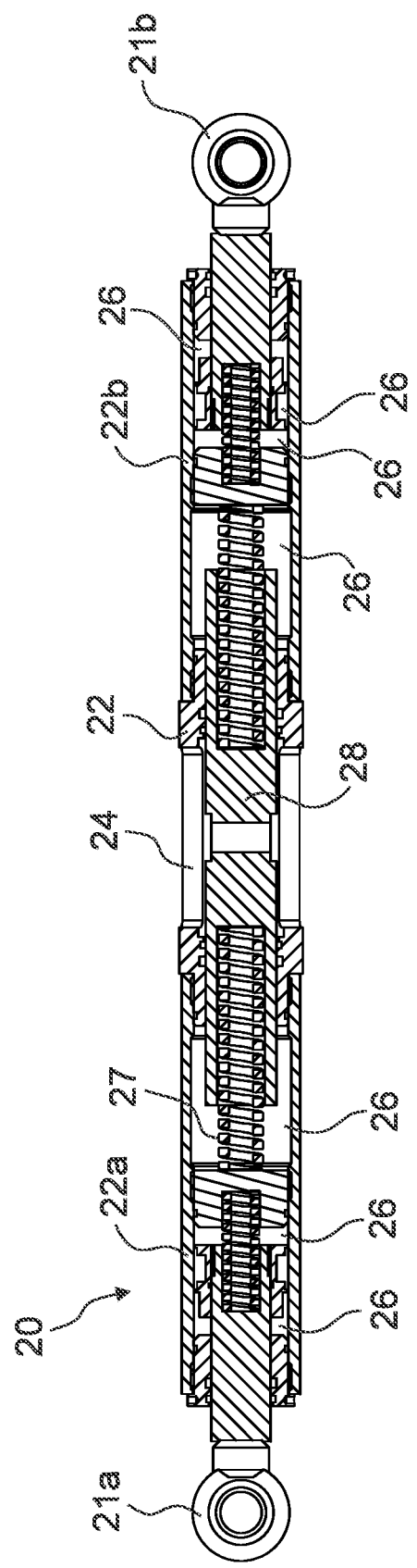
Figure 10A:
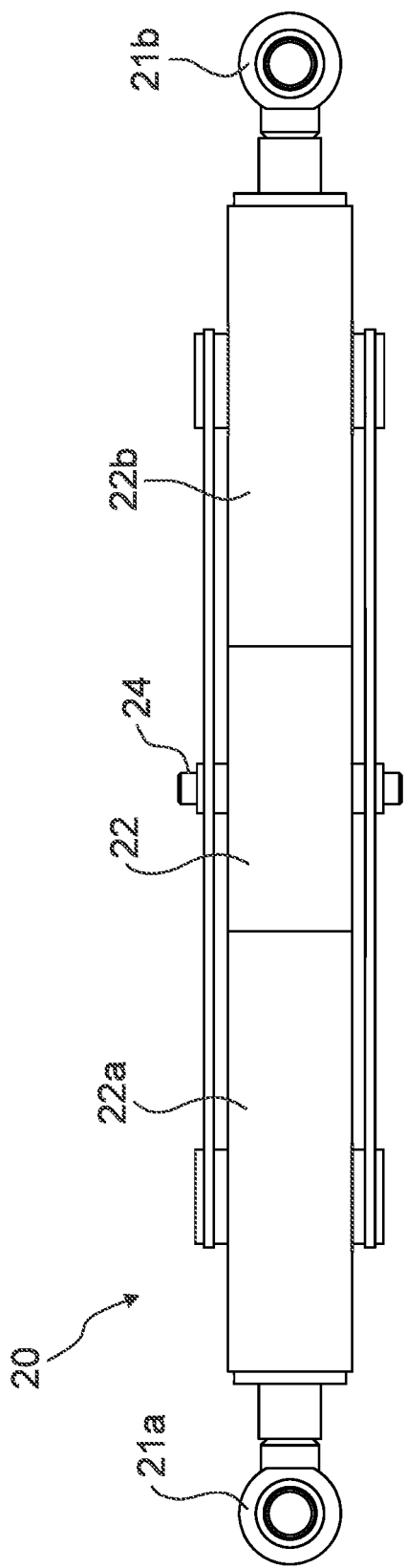
Figure 10B:
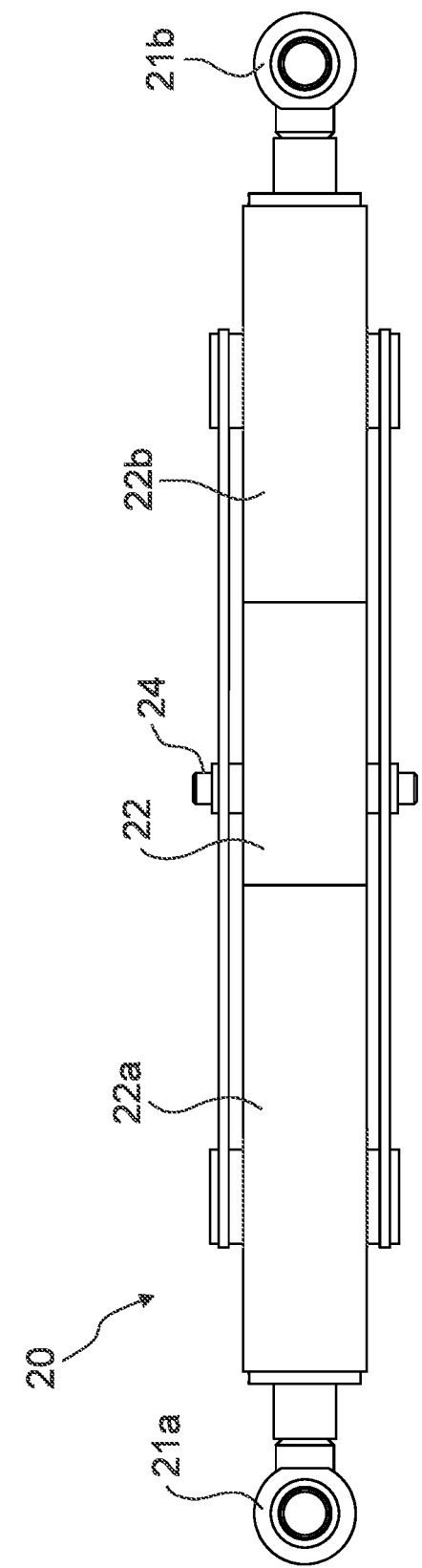

Further features and advantages of the invention shall be explained below with reference to the figures by way of example, where:

FIGS. 1a to 1c schematically show the rear view of an agricultural apparatus;

FIG. 2 schematically shows a perspective view of a detail of an agricultural apparatus;

FIG. 3 schematically shows the rear view of a detail of an agricultural apparatus;

FIGS. 4a to 4c schematically show the rear view of a detail of an agricultural apparatus;

FIG. 5 schematically shows the rear view of a detail of an agricultural apparatus; and FIGS. 6a and 6b schematically show the top view of a detail of an agricultural apparatus;

FIGS. 7a and 7b schematically show the front view of a detail of an agricultural apparatus;

FIG. 8 shows a schematic perspective view of a damping element;

FIGS. 9a and 9b schematically show a damping element;

FIGS. 10a and 10b schematically show a damping element;

FIG. 11 schematically shows a damping element; and

FIG. 12 schematically shows a mechanical damping element.

FIGS. 1a to 1c show an agricultural apparatus 1 which is configured as a field sprayer in a rear view. It can be seen that apparatus 1 comprises a distributor linkage 10 with a central part 11. Furthermore, distributor linkage 10 comprises two booms 13 a and 13 b which are connected to central part 11 by joints. It can also be seen that booms 13 a and 13 b each comprise several linkage sections which are connected to one another by foldable joints. The individual linkage sections can be folded about a vertical axis so that the working width of the agricultural apparatus can be adapted. The linkage sections can be folded independently for respective boom 13 a and 13 b.

FIG. 1a shows a state in which booms 13 a and 13 b are fully folded out. FIG. 1b shows a state in which only the innermost linkage section of booms 13 a and 13 b is folded out, while the remaining linkage sections are folded in. FIG. 1c shows a state in which all the linkage section of boom 13 a are folded out, while only the innermost linkage section of boom 13 b is folded out.

FIG. 2 schematically shows a detail of a first embodiment of agricultural apparatus 1. The arrow indicates the direction of travel of agricultural apparatus 1. It can be seen that central part 11 comprises a rectangular frame part 11a standing upright in its front region, i.e. disposed in the direction of travel. Frame part 11a can be used, for example, to connect central part 11 to agricultural apparatus 1 in a rotationally fixed manner. Frame part 11a can be connected to agricultural apparatus 1 in particular also in a height-adjustable manner.

Furthermore, central part 11 comprises a transverse frame 16 in its rear lower region. Two intermediate frames 12 a and 12 b are arranged on transverse frame 16 pointing upwardly. Intermediate frames 12 a and 12 b are connected to central part 11 in an articulated manner so that they can each be moved about horizontal axes of rotation h1 and h2 and vertical axes of rotation v1 and v2. The connection of intermediate frames 12 a and 12 b to transverse frame 16 can be effected, for example, by way of ball joints, presently not shown, which enable the rotational motions described. Intermediate frames 12 a and 12 b are therefore arranged on central part 11 such that their respective horizontal axes of rotation h1 and h2 run in the lower region of distributor linkage 10.

FIG. 2 furthermore shows that intermediate frame 12 a is connected to central part 11 by way of a first hydraulic actuating device 14. Where one end of hydraulic actuating device 14 is connected to intermediate frame 12 a in its upper region. The other end of actuating device 14 is connected to the central frame in its lower region, specifically on the side disposed closer to intermediate frame 12 b. In other words, hydraulic actuating device 14 is arranged at an angle between intermediate frame 12 a and central part 11. The respective connection points to intermediate frame 12 a and central part 11 are spaced from horizontal axis of rotation h1 of intermediate frame 12 a. This enables advantageous transmission of force from the hydraulic actuating device to intermediate frame 12 a in order to achieve a rotational motion of intermediate frame 12 a about its horizontal axis of rotation h1.

It can also be seen that intermediate frame 12 a and intermediate frame 12 b are connected to one another by way of a second hydraulic actuating device 15. Second hydraulic actuating device 15 is arranged to run horizontally in the upper region of intermediate frames 12 a and 12 b. A rotational motion of intermediate frame 12 b about its horizontal axis of rotation h2 can be obtained by appropriate actuation of actuating devices 14 and 15. This is described in more detail below with reference to FIGS. 4a to 4c.

Actuating devices 14 and 15 are configured as hydraulic cylinders 14 and 15 in the embodiment shown.

FIG. 2 furthermore shows that intermediate frames 12 a and 12 b are each connected at their upper and lower ends to booms 13 a and 13 b in an articulated manner. Booms 13 a and 13 b can each move about a vertical axis of rotation v1, v2 with respect to intermediate frames 12 a and 12 b. With regard to horizontal rotations, booms 13 a and 13 b are attached in a rotationally fixed manner to intermediate frames 12 a and 12 b. A rotational motion of intermediate frames 12 a and 12 b about their horizontal axes of rotation h1 and h2 is thus transmitted to booms 13 a and 13 b, respectively. In other words, booms 13 a and 13 b can be moved by way of hydraulic actuating devices 14 and 15 about horizontal axes of rotation h1 and h2 of intermediate frames 12 a and 12 b. The inclination of booms 13 a and 13 b can thus be controlled by way of actuating devices 14 and 15. On the one hand, this can be used to adapt the inclination of booms 13 a and 13 b to the ground. On the other hand, damping of the vibration motions of booms 13 a and 13 b in the vertical direction can also be achieved by way of suitable control of actuating devices 14 and 15. It is also possible to largely decouple the motions of booms 13 a and 13 b from the motions of agricultural apparatus 1 by suitably actuating hydraulic actuating devices 14 and 15.

It can also be seen in FIG. 2 that two hydraulic actuating devices 17a and 17b each connect booms 13 a,b to intermediate frames 12 a,b. The articulated arrangement of booms 13 a,b on respective intermediate frames 12 a,b makes it possible by way of actuating devices 17 a,b to move booms 13 a and 13 b about respective vertical axes of rotation v1 and v2. In particular, actuating devices 17 a,b can be used to transfer distributor linkage 10 from a working to a transport position, or vice versa. It is also possible for actuating devices 17 a,b to be controlled in order to dampen vibrations of booms 13 a,b in or opposite to the direction of travel of agricultural apparatus 1.

It can also be seen that intermediate frames 12 a,b each comprise a curved articulation plate 18 a,b at their respective upper ends. An outer end of articulation plates 18 a,b is connected to actuating device 17 a,b, while the other outer end of articulation plates 18 a,b is connected to boom 13 a,b. With such a configuration of intermediate frames 12 a,b, advantageous transmission of force between intermediate frames 12 a,b and booms 13 a,b can be achieved.

FIG. 3 schematically shows a detail of the first embodiment of agricultural apparatus 1 shown in FIG. 2 in a rear view. FIG. 3 shows a state of distributor linkage 10 in which both booms 13 a,b have an angle of 90° relative to the vertical. On level ground, for example, this state can correspond to a normal working position of distributor linkage 10 in which both booms 13 a,b are led parallel to the ground.

In contrast, FIGS. 4a to 4c show in a rear view various states of inclination of distributor linkage 10 corresponding to the embodiment shown in FIG. 2.

FIG. 4a shows an inclination state of distributor linkage 10 in which boom 13 b is angled up, while boom 13 a has an angle of 90° relative to the vertical. It can be seen that actuating device 15, which connects intermediate frames 12 a and 12 b, is shortened compared to the state shown in FIG. 3, i.e. the piston of hydraulic cylinder 15 has been retracted. In contrast, the length of actuating device 14 is unchanged compared to the state shown in FIG. 3. For example, the piston of hydraulic cylinder 14 can have been locked in position by closing a check valve. It is also possible that a pressure acting upon hydraulic cylinder 14 has been dynamically adapted in order to prevent a motion of intermediate frame 12 a. In any case, boom 12 a is affixed with respect to central part 11, it therefore does not move about its horizontal axis of rotation. Intermediate frame 12 a then acts as a rigid element and a force due to the shortening of actuating device 15 acts upon intermediate frame 12 b and causes a torque about the latter's horizontal axis of rotation. This in turn leads to boom 13 b angling up. In a similar manner, extending the piston of hydraulic cylinder 15 (not shown) while maintaining the piston position of hydraulic cylinder 14 results in boom 13 b angling down.

FIG. 4b shows an inclination state of distributor linkage 10 in which boom 13 a is angled up, while boom 13 has an angle of 90° relative to the vertical. It can be seen that actuating device 14, which connects intermediate frame 12 a to central part 11, is shortened compared to the state shown in FIG. 3, i.e. the piston of hydraulic cylinder 14 has been retracted. As a result, a force acts upon intermediate frame 12 a which results in a torque about the latter's horizontal axis of rotation. This in turn leads to boom 13 a angling up. It can also be seen that actuating device 15 has also been shortened compared to the state shown in FIG. 3, i.e. the piston of hydraulic cylinder 15 has been retracted. By retracting the piston of hydraulic cylinder 15, the motion of intermediate frame 12 a is not transmitted to intermediate frame 12 b. In an analogous manner, an extension (not shown) of the piston of both hydraulic cylinders 14 and 15 results in boom 13 a angling down.

FIG. 4c shows an inclination state of distributor linkage 10 in which boom 13 a is angled up, while boom 13 b is angled down. In other words, distributor linkage 10 is tilted clockwise when viewed in the direction of travel. It can be seen that actuating device 14 is shortened compared to the state shown in FIG. 3, i.e. the piston of hydraulic cylinder 14 has been retracted. As described above with reference to FIG. 4b, this leads to boom 13 a angling up. Furthermore, it can be seen that the length of actuating device 15 is unchanged compared to the state shown in FIG. 3. For example, the piston of hydraulic cylinder 15 can have been locked in position by closing a check valve. It is also possible that a pressure acting upon hydraulic cylinder 15 has been dynamically adapted in order to keep the position of the piston constant. In any case, actuating device 15 therefore acts as a rigid element. The rotational motion of intermediate frame 12 a about its horizontal axis of rotation results in a force upon intermediate frame 12 b which leads to a corresponding rotational motion of intermediate frame 12 b about its horizontal axis of rotation. This results in boom 13 b angling down.

In view of what has just been stated, it goes without saying that it is possible to create any inclination states of booms 13 a and 13 b by adjusting hydraulic actuating devices 14 and 15, in particular the piston position of hydraulic cylinders 14 and 15 accordingly. For example, it is possible for the piston of hydraulic cylinder 14 to be retracted for angling boom 13 a up. If, at the same time, the piston of hydraulic cylinder 15 is retracted to a greater extent than shown in FIG. 4b, boom 13 b is also angled up.

It can also be seen in FIGS. 4a to 4c that the length of actuating devices 17 a,b does not have to be changed, regardless of the state of inclination of boom 13 a,b, because the inclination of boom 13 a and 13 b is controlled directly by way of the inclination of intermediate frames 12 a and 12 b, where actuating devices 17 a and 17 b connect intermediate frames 12 a and 12 b to booms 13 a and 13 b. This eliminates the need to have to carry along actuating devices 17 a and 17 b when controlling the inclination of booms 13 a and 13 b.

FIG. 5 schematically shows a detail of the second embodiment of agricultural apparatus 1 in a rear view. The second embodiment shown differs from the embodiment shown in FIGS. 2 to 4 in that second actuating device 15 connects central part 11 to second intermediate frame 12 b. In the embodiment shown, the arrangement of second actuating device 15 is symmetrical to the arrangement of first actuating device 14. Intermediate frames 12 a and 12 b are then decoupled from one another with respect to rotational motions about their horizontal axes of rotation. Booms 13 a and 13 b are therefore angled up or down, respectively, directly by retracting or extending the pistons of hydraulic cylinders 14 or 15, respectively.

FIGS. 6a and 6b schematically show a detail of agricultural apparatus 1 in a top view. In addition to the elements of the distributor linkage described further above, a damping assembly 19 can be seen which is arranged between intermediate frames 12 a and 12 b which are in the direction of travel disposed at the front. Damping assembly 19 can comprise one or more damping elements 20. Damping elements 20 can comprise, for example, one or more in particular hydraulic extension cylinders and/or rubber elements, as shown in more detail in FIGS. 7a and 7b.

FIG. 6a shows a state in which both booms 13 a and 13 b have an angle of 90° relative to the direction of travel of agricultural apparatus 1. In contrast, FIG. 6b shows a state in which boom 13 a is deflected in the direction of travel while boom 13 b is deflected in a direction opposite to the direction of travel. The state shown in FIG. 6b can occur, for example, due to vibrations of the distributor linkage in the direction of travel caused by yawing motions of agricultural apparatus 1. It can be seen how the vibration motion of booms 13 a and 13 b is converted into rotational motions of intermediate frames 12 a and 12 b by actuating devices 17 a and 17 b and curved articulation plates 18 a,b. It can furthermore be seen that damping assembly 19 in FIG. 6b has been displaced horizontally compared to the state shown in FIG. 6a. In the case shown, intermediate frames 12 a and 12 b are coupled in the horizontal direction by way of damping assembly 19. A motion in the horizontal direction is damped and transmitted from one boom to the other. The transmission of forces resulting from such vibrations to rigid central part 11 and agricultural apparatus 1 can thus be reduced.

FIGS. 7a and 7b schematically show a detail of agricultural apparatus 1 in a front view, i.e. viewed in a direction opposite to the direction of travel of the agricultural apparatus.

FIG. 7a shows a first embodiment of damping assembly 19 which comprises a hydraulic cylinder 20 as a damping element. When one of booms 13 a,b moves in or opposite to the direction of travel of the agricultural apparatus, the piston of extension cylinder 19 can move horizontally and thereby transmit the motion to the other boom. At the same time, cylinder 20 passively dampens this motion due to the hydraulic fluid. It is also possible that a pressure applied to the chambers of cylinder 20 is actively controlled in order to achieve active damping. In particular, it is possible for a vibration motion of booms 13 a,b to be determined by way of sensors (not shown). These sensors can be, for example, acceleration sensors which are arranged on booms 13 a,b. However, it is also possible to measure changes in pressure in the chambers of cylinder 20 and/or actuating devices 17a and 17b for determining such vibrations. It is then possible to regulate the pressure in the chambers of cylinder 20 such that the vibration motion is damped.

It is also possible for hydraulic cylinder 20 to comprise several hydraulic chambers, where it is possible to control the hydraulic pressure individually in the respective chambers. It is also possible for additional mechanical spring elements to be arranged in the hydraulic chambers. This allows for an additional passive damping effect to be obtained. Such an embodiment is described in detail below with reference to FIGS. 8 to 10.

FIG. 7b shows an alternative embodiment of damping assembly 19. Damping assembly 19 is there configured in the form of two rubber buffer elements between the central part and intermediate frames 12 a and 12 b. This represents a simple and inexpensive variant of a damping assembly 19. This embodiment is described in more detail further below with reference to FIG. 11.

Alternatively it is possible that damping assembly 19 comprises two hydraulic cylinders which are arranged between the central part and intermediate frames 12 a and 12 b. This can achieve active damping of vibration motions, as described above.

FIG. 8 shows a perspective view of a first embodiment of damping assembly 19. It can be seen that damping assembly 19 is formed to be cylindrical and comprises outer attachment elements 21 a,b at both ends. Outer attachment elements 21 a,b can be connected, for example, to intermediate frames 12 a,b. It can also be seen that damping assembly 19 comprises a central housing part 22. Central housing part 22 is arranged centrally in the longitudinal direction of damping assembly 19. It can be seen that central housing part 22 is configured as a hollow cylinder and comprises an opening 23. Opening 23 is presently configured as a long hole. Furthermore, damping assembly 19 comprises two outer housing parts 22 a,b which connect to outer attachment elements 21 a,b. The outer diameter of central housing part 22 is greater than the outer diameter of outer housing parts 22 a,b.

An inner attachment element 24 is arranged in the interior of damping assembly 19. Inner attachment element 24 is exposed or accessible, respectively, through opening 23 in housing part 22. Inner attachment element 24 can be used in particular to attach damping element 20 to distributor linkage 10. Inner attachment element 24 can be, for example, a through-hole or a threaded hole, where the connection, for example, to central part 11, can be effected by way of suitable attachment devices. FIG. 8 furthermore shows connections 25 which are connected to hydraulic chambers 26 disposed in the interior of damping assembly 19. The hydraulic chambers disposed on a side of inner attachment element 24 represent a damping element 20. If damping assembly 19 is firmly connected by way of inner attachment element 24 to another element, for example, to central part 11, then damping assembly 19 can move in its longitudinal direction by the position of inner attachment element 24. This is explained in more detail below with reference to FIGS. 9a, 9b, 10a and 10b.

A top view of damping assembly 19 shown in FIG. 8 can be seen in FIG. 9a. In particular, inner attachment device 24 as well as opening 23 in central housing part 22 can be seen there.

FIG. 9b shows a section of damping assembly 19 along line A-B drawn in FIG. 9a. The view onto damping assembly 19 there corresponds to a view in or opposite to the direction of travel of agricultural apparatus 1 to which damping assembly 19 is attached during operation. It can be seen that damping assembly 19 comprises a plurality of hydraulic chambers 26, where chambers 26 each disposed on a side of attachment element 24 form a damping element 20. Each of chambers 26 can be connected to a hydraulic circuit by way of a respective connection 25. Each chamber 26 can be associated with a hydraulic valve (not shown) so that the pressure in each hydraulic chamber 26 can be set individually. In the embodiment shown, a mechanical spring element 27 is arranged in each of four inner hydraulic chambers 26. With a compression or expansion of respective hydraulic chamber 26, mechanical spring elements 27 exert a restoring force upon respective hydraulic chamber 26. It goes without saying that the number of hydraulic chambers 26 and spring elements 27 shown is merely by way example.

It can furthermore be seen that attachment element 24 is configured as a through-hole extending from top to bottom in damping assembly 19. Damping assembly 19 can therewith be attached to central part 11, for example, by way of a suitable screw or plug connection. FIG. 9b furthermore shows that the through-hole in the interior of damping assembly 19 extends through a block-like member 28 which is configured as a solid cylinder. Block-like member 28 is surrounded on the outside by housing parts 22, 22 a and 22 b which are mounted to be movable relative to block-like member 28. In other words, housing parts 22, 22 a and 22 b can displace relative to block-like member 28 in the longitudinal direction of damping assembly 19.

If, for example, attachment element 21a is now connected to intermediate frame 12 a, then a force, for example, due to a yawing motion of boom 13 a, in the longitudinal direction can be transmitted to damping assembly 19. If this force acts upon damping assembly 19, for example, from the left-hand side in FIG. 9b, then it is damped by mechanical spring elements 27 and the hydraulic fluid in chambers 26. Depending on the magnitude of the force, displacement of outer housing part 22 a to the right-hand side can occur. Due to a positive-fit connection between outer housing part 22 a and central housing part 22, the latter is also displaced in this case to the right-hand side and the displacement is transmitted analogously to other outer housing part 22 b. Further damping of the force takes place on the right-hand side of damping assembly 19 by way of mechanical spring elements 27 and hydraulic chambers 26 arranged there. If the force is not fully damped, then outer attachment element 21 b is likewise displaced to the right-hand side, and this motion is correspondingly transmitted to intermediate frame 12 b and boom 13 b.

In other words, passively damped transmission of a yawing motion thus takes place from one boom 12 a to other boom 12 b. Due to displaceable central housing part 22, no force, or only a very small one, is transmitted in this process to block-like member 28 and thereby to distributor linkage 10.

It is also possible to actively dampen the motions just described by regulating the hydraulic pressure in chambers 26 accordingly. For example, it is possible to detect a yawing motion of booms 13 a,b by way of suitable sensors as described further above. The pressure in chambers 26 can then be adjusted by way of a regulating device such that the yawing motion is actively compensated for.

FIGS. 10a and 10b show the displacement just described of damping assembly 19 in its longitudinal direction when a force acts from the left-hand side. FIGS. 10a and 10b there show damping assembly 19 from the front, i.e. seen from a direction opposite to the direction of travel of agricultural apparatus 1. FIG. 10a shows damping assembly 19 in its resting state. FIG. 10b shows the state that is given as a result of a force that arises, for example, as a result of a yawing motion. It can be seen that the position of inner attachment element 24 has not changed, while outer attachment elements 21 a,b, outer housing parts 22 a,b, and central housing part 22 have been displaced to the right.

FIG. 11 shows an alternative embodiment of a damping assembly 19. This embodiment as well comprises outer attachment elements 21 a,b which can each be connected to intermediate frames 12 a,b. Furthermore, damping assembly 19 also comprises an inner attachment element 24, by way of which damping assembly 19 can be attached, for example, to center part 11. In contrast to the embodiment shown in FIGS. 8 to 10, damping assembly 19 shown in FIG. 11 comprises two hydraulic damping elements 20 which are separated from one another by inner attachment element 24 and are not connected to one another.

Damping elements 20 are presently configured as hydraulic cylinders. Each of the hydraulic cylinders comprises two hydraulic chambers 26. The hydraulic cylinders can be configured, for example, as double-action cylinders. Hydraulic chambers 26 can each be connected to a hydraulic circuit by way of a respective connection 25. Each chamber 26 can be associated with a hydraulic valve (not shown) so that the pressure in each hydraulic chamber 26 can be set individually.

As described further above, it is also possible in this embodiment to actively dampen the motions of the respective booms by regulating the hydraulic pressure in chambers 26 accordingly. For example, it is possible to detect a yawing motion of booms 13 a,b by way of suitable sensors as described further above. The pressure in chambers 26 can then be adjusted by way of a regulating device such that the yawing motion is actively compensated for. Due to separate damping elements 20, this configuration is structurally simpler and less expensive than the embodiment described with reference to FIGS. 8 to 10.

FIG. 12 shows a further alternative embodiment of a damping assembly 19. This embodiment as well comprises outer attachment elements 21 a,b which can each be connected to intermediate frames 12 a,b. Furthermore, this embodiment of damping assembly 19 also comprises an inner attachment element 24, by way of which damping assembly 19 can be attached, for example, to center part 11. In contrast to the embodiment shown in FIGS. 8 to 11, damping assembly 19 comprises two rubber buffers 29 which are arranged between outer attachment elements 21 a,b and inner attachment element 24. This dampens motions and forces along the longitudinal axis of damping assembly 19 in a simple and inexpensive manner.

It goes without saying that the features mentioned in the embodiments described above are not restricted to these special combinations and are also possible in any other combinations. Furthermore, it goes without saying that the geometries shown in the figures are only by way of example and are also possible in any other configuration.

The invention claimed is:

1. An agricultural apparatus for spreading material, comprising:
   a distributor linkage which can be folded on both sides, comprising:
      a central part, where said central part is connected in a rotationally fixed manner to said agricultural apparatus;
      two intermediate frames connected to said central part, in particular by joints;
      two lateral booms connected to said respective intermediate frames; and
      a damping assembly for damping motions of said first boom and said second boom in the direction of travel of said agricultural apparatus,
      where said damping assembly connects said intermediate frames to one another independently of said central part, or
      where said damping assembly connects said respective intermediate frames to said central part.

2. The agricultural apparatus according to claim 1, where said damping assembly comprises at least one hydraulic damping element, in particular a hydraulic cylinder.

3. The agricultural apparatus according to claim 2, where said damping assembly furthermore comprises at least one hydraulic valve which is associated with said at least one hydraulic damping element.

4. The agricultural apparatus according to claim 3, furthermore comprising a sensor device which is configured to detect vibrations of said distributor linkage in the horizontal direction.

5. The agricultural apparatus according to claim 4, where said sensor device comprises one or more pressure sensors, where said pressure sensors are configured to detect a pressure or a change in pressure in said hydraulic damping element.

6. The agricultural apparatus according to claim 4, further comprising a control unit, where said control unit is configured to:
- process the values of said sensor device, and
- actuate said at least one hydraulic valve based on the sensor values processed so that a detected vibration is actively damped.

7. A method for controlling an agricultural apparatus according to claim 6, comprising
- said sensor device detecting sensor values;
- said control unit processing the sensor values; and
- actuating said hydraulic valve based on the sensor values processed so that a detected vibration is actively damped by said hydraulic damping element.

8. An agricultural apparatus according to claim 2, where said at least one hydraulic damping element comprises at least two hydraulic chambers, where each hydraulic chamber is associated with a hydraulic valve.

9. An agricultural apparatus according to claim 8, where at least one hydraulic chamber comprises a mechanical spring element.

10. The agricultural apparatus according to claim 1, where said damping assembly comprises at least one mechanical spring element.

* * * * *